UNITED STATES PATENT OFFICE.

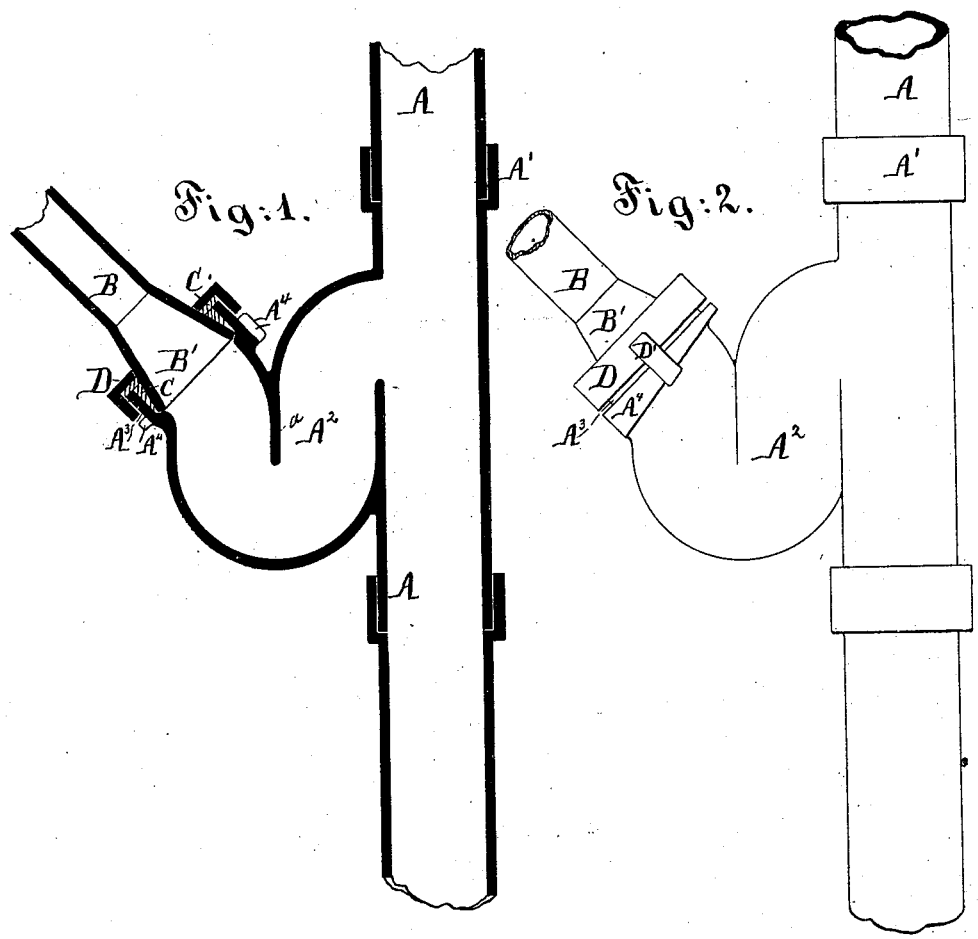

WILLIAM CHRISTIE, OF NEW YORK, N. Y.

IMPROVEMENT IN TRAPS.

Specification forming part of Letters Patent No. 209,653, dated November 5, 1878; application filed April 3, 1878.

*To all whom it may concern:*

Be it known that I, WILLIAM CHRISTIE, plumber, of New York city, in the State of New York, have invented certain new and useful Improvements relating to Traps and Connections, of which the following is a specification:

I make an efficient trap on the side of and in one with the upright pipes of cast-iron or other material employed in house-plumbing; and I have devised efficient and convenient means for connecting the ordinary lead pipes thereto.

The following is a description of what I consider the best means of carrying out the invention.

The accompanying drawings form a part of this specification.

Figure 1 is a central vertical section, and Fig. 2 is a side elevation, of my improved trap.

Similar letters of reference indicate like parts in both the figures.

A is a portion of the ordinary upright pipe, which is supposed to be formed in lengths and to extend from the top to the bottom of a dwelling, the upper end being in the best practice open through the roof.

$A^1$ is the ordinary hub or enlargement, which receives the base of the section above.

$A^2$ is a trap opening into the side of the pipe and formed in a single casting therewith. The curved bottom of the trap intersects or joins the pipe A below the opening in the latter. $a$ represents a partition extending downwardly in the trap, to prevent the escape of foul gases from the pipe A out through the branch pipe B.

By this construction no foul gases can escape from the main pipe A through the branch pipe B as long as the water in the trap is slightly above the lower edge of the partition $a$. It may be equipped with an ordinary removable plug in the bottom to facilitate cleaning, if such shall ever be required. The outer end is formed with an enlargement or hub, $A^3$, adapted to receive the smaller end of a branch pipe.

B is the branch pipe flowing from a hand-basin, water-closet, urinal, bath-tub, sink, or any other piece of apparatus. It may in some cases receive water from the whole or a portion of the roof. The junction is peculiarly formed. The body of the pipe B is made smaller than the interior of the hub $A^3$, and is received in a close-fitting hole in a movable locking device, D D', the claws D' of which engage strongly with the part $A^2$, as will presently appear. After the device D D' has been applied on the lead pipe B, the end of the latter is enlarged, as indicated by B', thus forming a reliable head, which fills the socket or interior of the hub $A^3$. What space remains unfilled is stopped by the cement C.

The exterior of the trap adjacent to the hub $A^3$ is formed with wedge-like projections $A^4$, arranged, as shown, with spaces between. These spaces are each of a width a little greater than the corresponding claw D' of the locking-piece D D'. After the cement C has been properly applied the locking device D D' is drawn firmly down, thereby seizing the pipe B by its enlargement B', and, the claws D' being properly made to pass through the spaces between the locking-projections $A^4$, the device D D' is forcibly turned around. By this turning movement the claws D' are brought engaged under the inclined faces of the locking-pieces $A^4$, and the joint is made strong and tight.

There may be another trap independent of this trap $A^1$ between the hand-basin or other apparatus and the stand-pipe A; but I do not esteem such generally necessary. The trap $A^2$ will perform all its usual functions, and, being cast in one with the pipe $A^1$, is economical of expense, and, what is of great importance, reduces the liability of fracture or leakage between the trap and the stand-pipe.

Another point of great practical importance lies in the fact that in many or most cases water trickling down from a higher point will find its way into my trap $A^2$ by reason of its contiguity and its mode of presentation to the stand-pipe. Thus, if a room is unoccupied, or for any reason an apparatus is not used, the foul gases which are liable to rise in the pipe A cannot flow into the apartment, because the trap will, by the water trickling down the pipe A, be kept filled sufficiently to compensate for evaporation.

Modifications may be made. The trap may be placed near the middle or near the bottom of a length of pipe, A, instead of at the top, as here shown.

Some portion of the benefit of the invention may be realized without the fastening means D D'. In such case any ordinary form of pipe may be employed for the branch, and the joint between such branch and my enlargement or hub $A^3$ may be made of any ordinary cementing material, applied in the ordinary manner, without my peculiar provisions for joining.

I claim as my invention—

1. The trap $A^2$, having the partial partition $a$, and formed in a single casting with such stand-pipe, with its bottom joined thereto below the opening, as shown, in combination with a stand-pipe, A, extending from the bottom to or near the top of the building, and with a branch pipe, B, so that the trap shall not only perform its ordinary functions relatively to the communication to and from the branch, but shall, when the branch is disused, tend to keep full by any water trickling down the stand-pipe, as herein specified.

2. The stand-pipe A $A^1$, trap $A^2$, hub $A^3$, and projections $A^4$, in combination with the branch pipe B B' and locking-piece D D', as and for the purposes herein specified.

In testimony whereof I have hereunto set my name in presence of two subscribing witnesses.

WILLIAM CHRISTIE.

Witnesses:
JOHN A. WALKER,
BERNARD GORMAN.